United States Patent
Malina et al.

(10) Patent No.: US 9,639,287 B1
(45) Date of Patent: May 2, 2017

(54) WRITE COMMAND REPORTING

(71) Applicant: Western Digital Technologies, Inc., Irvine, CA (US)

(72) Inventors: James N. Malina, Irvine, CA (US); Albert H. Chen, Redmond, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/753,507

(22) Filed: Jun. 29, 2015

(51) Int. Cl.
*G06F 3/06* (2006.01)
*G06F 17/40* (2006.01)
*G06F 17/30* (2006.01)

(52) U.S. Cl.
CPC .......... *G06F 3/0619* (2013.01); *G06F 3/0659* (2013.01); *G06F 3/0688* (2013.01); *G06F 17/30185* (2013.01); *G06F 17/40* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |

(Continued)

*Primary Examiner* — Kaushikkumar Patel

(57) ABSTRACT

In operating a Data Storage Device (DSD) in communication with a host, a reported write command log is maintained that includes entries identifying pending write commands reported as completed to the host but whose data is not yet stored in at least one Non-Volatile Memory (NVM) of the DSD. The reported write command log is maintained to persist over power cycles. A write command is received from the host to store data in the at least one NVM and the data for the write command is buffered in a volatile memory of the DSD for storage in the at least one NVM. The reported write command log is updated to account for the write command as a pending write command reported as completed, and an indication is sent to the host reporting completion of the write command before completing storage of the data in the at least one NVM.

29 Claims, 6 Drawing Sheets

(56) References Cited

U.S. PATENT DOCUMENTS

| | | |
|---|---|---|
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |

(56) References Cited

U.S. PATENT DOCUMENTS

| | | |
|---|---|---|
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,523,319 B2 | 4/2009 | Challener et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,610,445 B1 * | 10/2009 | Manus ............... G06F 12/0804 711/104 |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |

(56) References Cited

U.S. PATENT DOCUMENTS

| | | |
|---|---|---|
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 * | 2/2013 | Ryan .................. G11B 27/36 714/14 |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,756,458 B2 | 6/2014 | Post et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 9,336,132 B1 * | 5/2016 | Aron .................. G06F 3/06 |
| 2003/0056060 A1 * | 3/2003 | Hertz ................ G06F 3/0613 711/112 |
| 2004/0078508 A1 * | 4/2004 | Rivard ............... G06F 11/2089 711/4 |
| 2006/0179381 A1 | 8/2006 | Durica et al. |
| 2008/0120470 A1 * | 5/2008 | Dhamankar ....... G06F 17/30368 711/135 |
| 2009/0031083 A1 * | 1/2009 | Willis ................ G06F 11/1441 711/135 |
| 2009/0113702 A1 | 5/2009 | Hogg |
| 2010/0306551 A1 | 12/2010 | Meyer et al. |
| 2011/0208933 A1 * | 8/2011 | Selfin ................ G06F 11/108 711/162 |
| 2011/0226729 A1 | 9/2011 | Hogg |
| 2012/0063255 A1 * | 3/2012 | Nakazumi ........... G06F 11/1441 365/228 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0042156 A1 * | 2/2013 | Srinivasan ......... G06F 11/1443 714/54 |
| 2014/0201424 A1 | 7/2014 | Chen et al. |
| 2015/0155044 A1 * | 6/2015 | Yin .................... G06F 13/28 365/185.24 |
| 2015/0261674 A1 * | 9/2015 | Wei .................. G06F 11/14 711/135 |
| 2016/0026537 A1 * | 1/2016 | Mizuno ............. G06F 3/0619 711/118 |

\* cited by examiner

WRITE COMMAND REPORTING

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). Another type of storage media can include a solid-state memory where cells are charged to store data.

In writing data to a disk, a DSD may temporarily store the data in a volatile memory before the data is written to the disk. In some cases, the volatile memory can be used as a write cache to queue or defer write commands received from a host until a more beneficial time from a performance perspective of the DSD. Such a mode of deferring write commands can be referred to as a Write Cache Enable (WCE) mode of performing write commands. In such a WCE example, the DSD may notify the host of the performance of the write command after the write command has been queued in the volatile memory but before the write command is actually performed on a Non-Volatile Memory (NVM) such as a disk. Although this arrangement can ordinarily allow for an improved performance from the perspective of the host, the write commands in the volatile memory are usually lost in the event of an unexpected power loss at the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
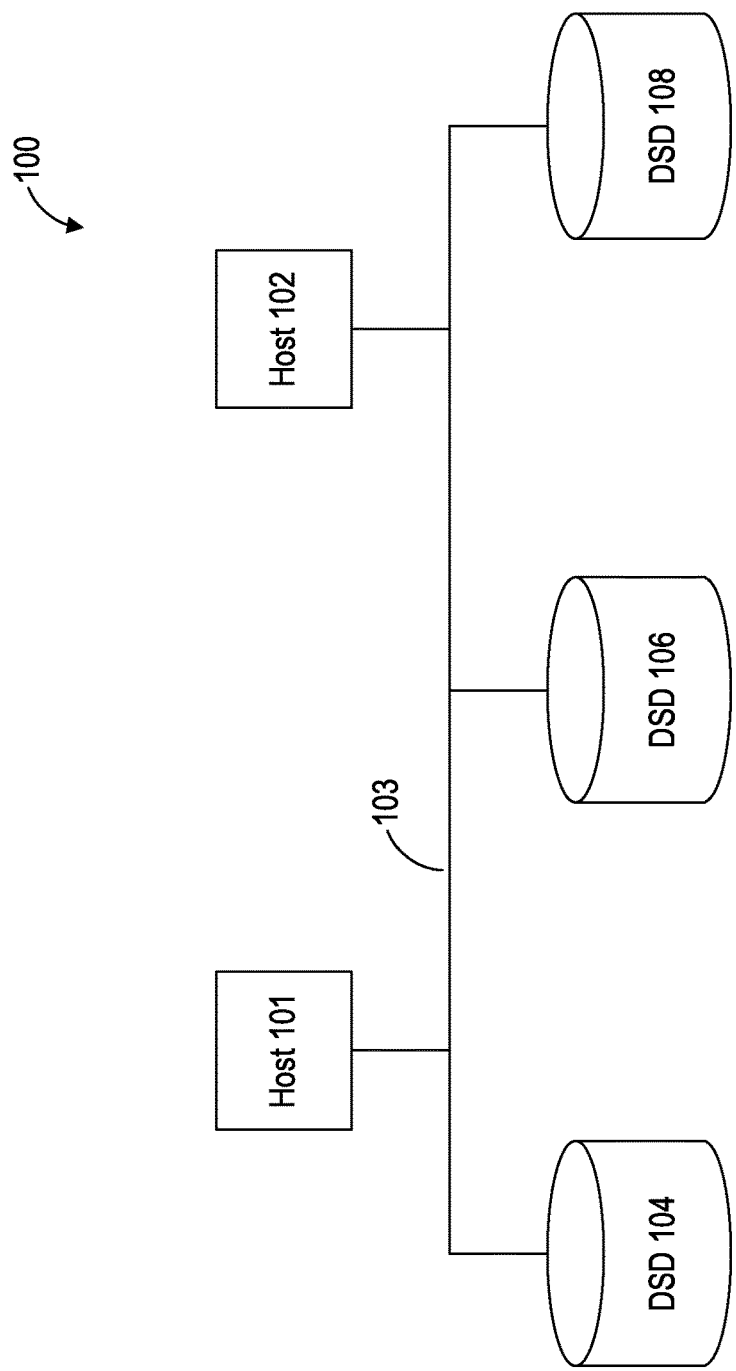
FIG. 1 is a block diagram depicting a system according to an embodiment.

FIG. 1 is a block diagram depicting system 100 according to an embodiment. As shown in FIG. 1, system 100 includes host 101 and host 102 which communicate via a network or bus 103 with Data Storage Devices (DSDs) 104, 106, and 108 to store and retrieve data. As used herein, a host can refer to a device that is capable of issuing a write command to a DSD to store data in the DSD.

In the example embodiment of FIG. 1, hosts 101 and 102 are separate from DSDs 104, 106, and 108 and may include, for example, a server or other computer system. In other embodiments, a host and a DSD may be housed together as part of a single electronic device, such as, for example, a laptop or notebook or another type of electronic device such as a tablet, smartphone, network media player, portable media player, or Digital Video Recorder (DVR). In yet another embodiment, a host may include another storage device such as a smart DSD that is capable of executing applications and communicating with other DSDs.

In the embodiment of FIG. 1, system 100 may serve as, for example, a data center or part of a data center with multiple DSDs. The components of FIG. 1 may or may not be physically co-located. In this regard, network/bus 103 may include a local area network, a wide area network, or the Internet.

Those of ordinary skill in the art will appreciate that other embodiments can include more or less than those elements shown in FIG. 1 and that the disclosed processes can be implemented in other environments. For example, other embodiments can include a different number of hosts or DSDs.

Figure 2:
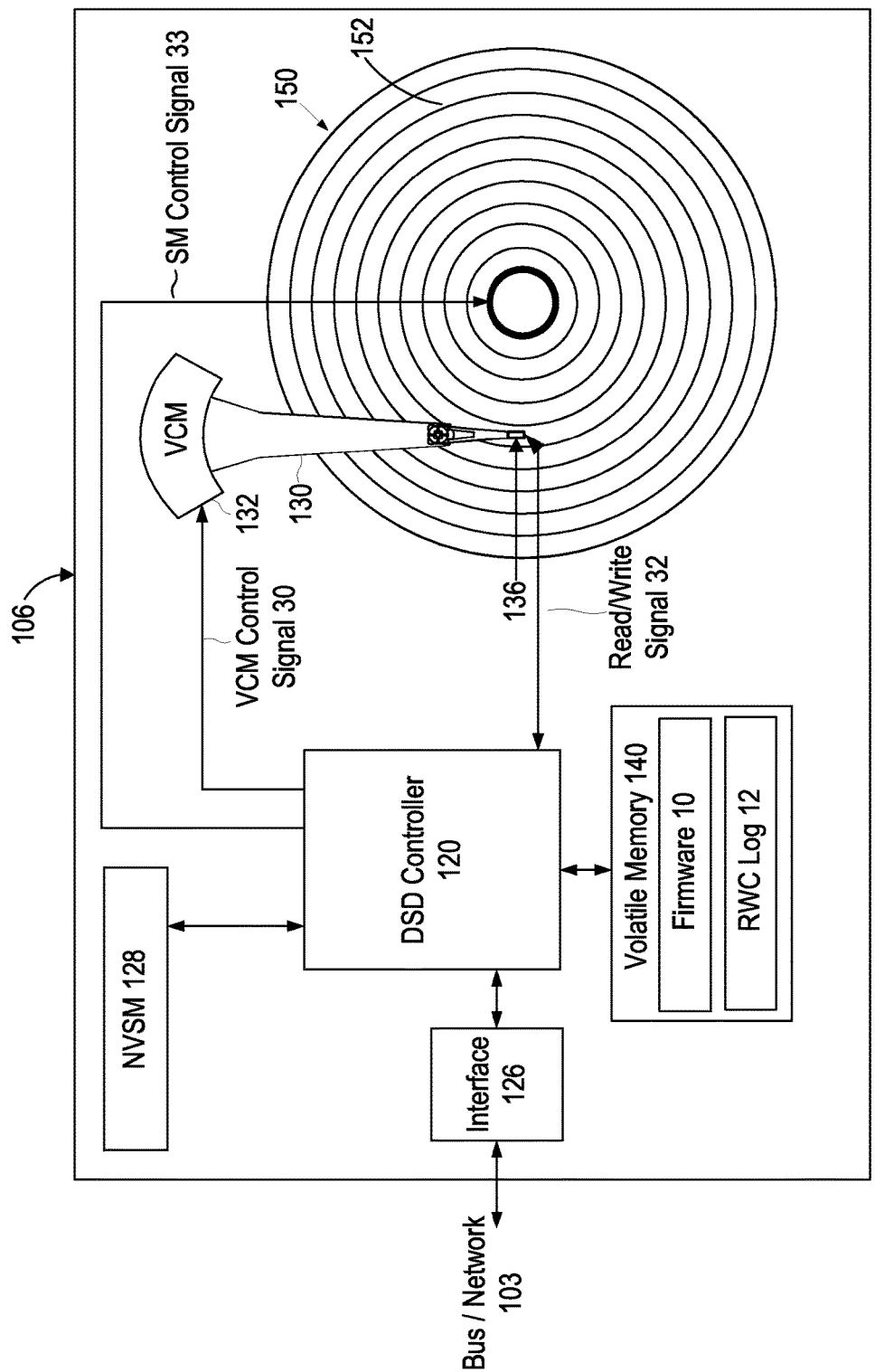
FIG. 2 is a block diagram of a Data Storage Device (DSD) in the system of FIG. 1 according to an embodiment.

FIG. 2 depicts a block diagram of DSD 106 according to an embodiment where DSD 106 includes Non-Volatile Memory (NVM) in the form of rotating magnetic disk 150 and Non-Volatile Solid-State Memory (NVSM) 128. In this regard, DSD 106 can be considered a Solid-State Hybrid Drive (SSHD) since it includes both solid-state and disk media. In other embodiments, each of disk 150 or NVSM 128 may be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC).

Interface 126 is configured to interface DSD 106 with hosts 101 and 102, and may interface according to a standard such as, for example, Ethernet, Serial Advanced Technology Attachment (SATA), PCI express (PCIe), Small Computer System Interface (SCSI), or Serial Attached SCSI (SAS). As will be appreciated by those of ordinary skill in the art, interface 126 can be included as part of controller 120.

In the example of FIG. 2, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152. A servo system of controller 120 controls the rotation of disk 150 with SM control signal 33 and controls the position of head 136 using VCM control signal 30.

Besides disk 150, DSD 106 may additionally or alternatively include NVSM 128 for storing data across power cycles. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 2, DSD 106 includes volatile memory 140, which can include, for example, a Dynamic Random Access Memory (DRAM). Volatile memory 140 can be used by DSD 106 to temporarily store data. Data stored in volatile memory 140 can include data read from NVM such as disk 150 or NVSM 128, data to be stored in NVM, instructions loaded from firmware 10 for execution by controller 120, and/or data used in executing firmware 10. Volatile memory 140 can also be used to temporarily store data for write commands intended for disk 150. In some embodiments, volatile memory 140 may be wholly or partially substituted by a non-volatile memory such as MRAM.

In the example of FIG. 2, volatile memory 140 also stores Reported Write Command (RWC) log 12. As discussed in more detail below, RWC log 12 can include entries identifying pending write commands reported as completed to host 101 or host 102, but whose data has not yet been stored in NVM such as disk 150 or NVSM 128. Such data may be buffered or cached in volatile memory 140 waiting to be stored on disk 150 or stored in NVSM 128. This can ordinarily allow DSD 106 to defer write commands received from a host until a more beneficial time from a performance perspective of the DSD. Such a mode of deferring write commands can be referred to as a Write Cache Enable (WCE) mode of performing write commands.

Although notifying the host that sent the write command that the data has been stored in NVM can improve the performance of system 100, an unexpected power failure at a DSD can often result in the data for the write command being lost at the DSD. The host may then need to resend its write commands to the DSD to restore the data or perform other recovery measures. In this regard, the host may keep a history of its commands in a memory of the host and may also be protected against power loss by its own battery backup.

As discussed in more detail below, RWC log 12 can be used to speed up or otherwise improve the recovery process performed by a host such as host 101 or host 102 after a power loss has occurred at a DSD such as DSD 106. RWC log 12 can be maintained to persist across power cycles so that the host can use RWC log 12 to determine which write commands were not actually stored in NVM and then only perform recovery actions for those write commands that were reported as complete but whose data was not actually stored in NVM. This can save memory and processing resources of the host during the recovery of the DSD in that the host does not need to read data from the DSD to determine what was actually stored in NVM or resend more write commands than necessary.

The benefit of using RWC log 12 generally increases with the scale of system 100. For example, a relatively large system may have many hosts with thousands of write commands recently sent to hundreds of DSDs. The use of RWC log 12 may significantly reduce the number of recovery actions (e.g., resending write commands or creating new write commands) performed by a host and save a considerable amount of time in recovering from a power loss at a DSD.

In other situations, the host may use RWC log 12 for other functions outside of recovery after a power loss. For example, the host may use RWC log 12 to compare against its own history of commands as part of a synchronization process with the DSD or may use RWC log 12 as a backup of its own history of commands.

Notifying host 101 or host 102 that data for write commands has been stored in NVM before actually storing the data in NVM can generally increase the number of host commands that can be issued by the host in a given period of time and reduce a latency in performing the commands from the perspective of both the DSD. In the example of disk 150, a higher number of pending commands for disk 150 can reduce an overall mechanical latency in performing the commands by using a Rotational Position Optimization (RPO) algorithm that rearranges the order for performing the commands to reduce the movement of head 136 over disk 150 in performing the commands.

In the implementation of FIG. 2, RWC log 12 is stored in volatile memory 140 and can be maintained over power cycles through the use of a power-safe write buffer that transfers RWC log 12 to NVSM 128 when there is an unexpected power loss at DSD 106. The kinetic energy from the rotation of disk 150 can be used to provide power for transferring RWC log 12 to NVSM 128 after a power loss. When a power loss is expected, as in the case of a shutdown process of DSD 106, the data for any pending write commands can be transferred to NVM such as disk 150 or NVSM 128 before powering off.

In other embodiments, RWC log 12 may not be stored in volatile memory 140 during operation of DSD 106. In such embodiments, RWC log 12 can be maintained in NVSM 128 or another non-volatile memory.

The memory reserved for storing RWC log 12 may be sized based on different design criteria. For example, RWC log 12 may be sized to include entries for a maximum number of write commands that can be deferred by DSD 106. In another example, DSD 106 may provide host 101 and host 102 with information concerning a queue depth or a number of commands that can be recorded in RWC log 12 so that the host can throttle the frequency of write commands to DSD 106 if the frequency of write commands would otherwise result in running out of space in RWC log 12. In another implementation, controller 120 of DSD 106 may delay reporting the completion of one or more write commands to a host if RWC log 12 becomes full or is approaching its size limit.

In operation, interface 126 receives host read and write commands from host 101 or host 102 via interface 126 for reading data from and writing data to NVM. In response to a write command from host 101 or host 102, controller 120 may queue the write commands in a command queue and buffer the data to be written for the write commands in volatile memory 140.

For data to be written on disk 150, a read/write channel (not shown) of controller 120 may encode the buffered data into write signal 32 which is provided to head 136 for magnetically writing data on disk 150. Controller 120 can provide VCM control signal 30 to VCM 132 to position head 136 over a particular track 152 for writing the data.

In response to a read command for data stored on disk 150, a servo system of controller 120 positions head 136 over a particular track 152. Controller 120 controls head 136 to magnetically read data stored in the track and to send the read data as read signal 32. A read/write channel of controller 120 can then decode and buffer the data into volatile memory 140 for transmission to host 101 or 102 via interface 126.

For data to be stored in NVSM 128, controller 120 receives data from interface 126 and may buffer the data in volatile memory 140. In one implementation, the data is then encoded into charge values for charging cells (not shown) of NVSM 128 to store the data.

In response to a read command for data stored in NVSM 128, controller 120 in one implementation reads current values for cells in NVSM 128 and decodes the current values into data that can be transferred to host 101 or host 102 via interface 126.

Although FIG. 2 shows an example singular device, the various embodiments described herein are not limited to applications in individual storage devices. In some embodiments, the RWC tracking and related data handling mechanisms can be applied to a server or controller which manages storage tiers including many storage or memory devices, and the tiers can include a cache/buffer tier that corresponds to volatile memory 140 as described above and another storage tier that corresponds to disk 150 and/or NVSM 128 as described above. Thus, a DSD may include such tiers.

Figure 3:
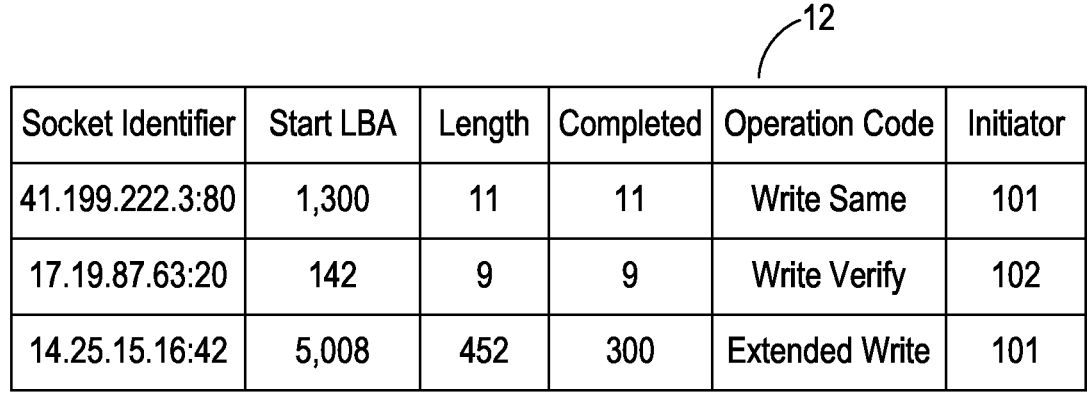
FIG. 3 illustrates an example of a Reported Write Command (RWC) log according to an embodiment.

FIG. 3 illustrates an example of RWC log 12 according to an embodiment where each of the three rows of RWC log 12 correspond to a different write command that has been reported to a host as completed but whose data has not yet been stored in an NVM (e.g., disk 150 or NVSM 128). In some implementations, RWC log 12 may be its own data structure and in other implementations, RWC log 12 can be included as part of another data structure such as a mapping table for associating logical addresses for data with physical addresses where the data is stored in DSD 106.

In the example of FIG. 3, RWC log 12 indicates a starting logical address (i.e., start Logical Block Address (LBA)) of data for a pending write command that has been reported to a host as having been completed. RWC log 12 also includes a length for the data to be stored for the write command which can refer to a logical address range for the data. In other implementations, the data for the write command may be identified differently such as with a start LBA and an end LBA for the data of the write command.

RWC log 12 may also include an indication of which host sent the write command. In the example of FIG. 3, the initiator column indicates whether the write command was sent by host 101 or by host 102. In one implementation, an initiator can be obtained from a SCSI write command received from the host and then used in RWC log 12 to indicate which host sent the write command. As discussed in more detail below with reference to FIG. 6, the indication of which host sent the write command can be used to send a notification to a specific host after a power loss or can be used by a host to determine which write commands were sent by the host.

In a case where network/bus 103 includes an Ethernet network, RWC log 12 can include a socket identifier in accordance with Transmission Control Protocol/Internet Protocol (TCP/IP). The socket identifier can then be used to indicate the host that sent the write command along with other information included in the socket identifier such as the port address of the host used to send the command, the IP address of the host, the port address where the command was received by the DSD, or the IP address of the DSD.

RWC log 12 in FIG. 3 also includes a completed length for each entry that corresponds to a number of logical blocks or a logical address range of the write command that has been stored in an NVM such as disk 150 or NVSM 128. In the example of FIG. 3, the entries of RWC log 12 are added in the order that the commands are received by DSD 106. The first two write commands at starting LBAs 1,300 and 142 have been completed as indicated by a completed length matching the length for each entry. The last write command starting at LBA 5,008 is partially completed with 300 LBAs out of a total length of 452 LBAs having been stored in NVM. In the event of an unexpected power loss, RWC log 12 would indicate to host 101 that it would only need to recover the last 152 LBAs of the write command starting at LBA 5,008.

In other embodiments, RWC log 12 may include a completion flag or other indicator to indicate that the data for the write command has been stored in NVM. In yet other embodiments, controller 120 may remove an entry (i.e., a row as depicted in FIG. 3) from RWC log 12 after the data for the write command has been stored in NVM.

The creation or ordering of entries in RWC log 12 in order of when corresponding write commands are received can also provide for maintaining coherency of the data during recovery if there have been several write commands to the same LBA. In some implementations, RWC log 12 can include a unique identifier used by the host for each command or a unique identifier based on the data to be written by the write command (e.g., a digital fingerprint calculated using the data for the write command). Such identifiers can be used by a host to determine when a write command was issued or which host issued the write command. In yet other implementations, the socket identifier may be used to determine when a write command was sent or which host sent the write command.

RWC log 12 in FIG. 3 also includes an operation code that can provide more information about the write command. As shown in FIG. 3, some examples of operation codes can include whether the write command was for an extended or long sequential write, a regular write, or whether a verify operation is needed for the command before the command is considered completed. The verification of a write can include reading the data from the NVM after it has been stored in the NVM.

In the case of a "write same" operational code, this can indicate that the data written for the command serves as filler data such as a series of "1"s to fill in an area of the NVM. When recovering data using RWC log 12, recovery can ordinarily be sped up since the host can use this operation code to quickly identify the pattern of filler data.

In other implementations, the operation code may indicate that the write command was for a particular area of NVM such as a "write zone" command where the data for the write command was intended for an entire zone of media such as a group of tracks 152 on disk 150 or an entire block of pages in NVSM 128.

RWC log 12 in other embodiments can include less or different information than that shown in FIG. 3 to keep a record of pending commands that have been reported as completed. For example, in one embodiment RWC log 12 may only include a starting logical address for each pending write command and a length for each pending write command.

Example Processes

Figure 4:
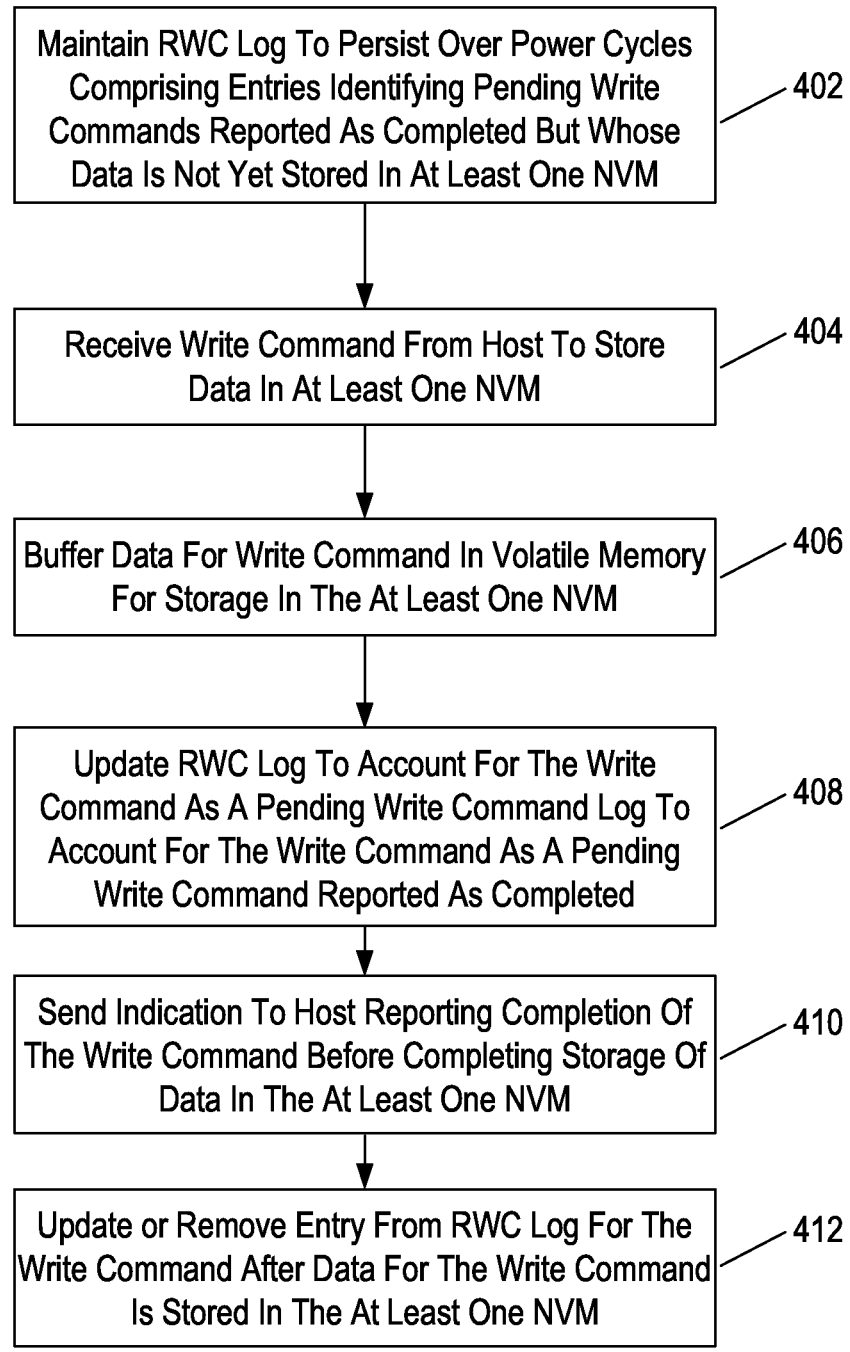
FIG. 4 is a flowchart for the maintenance of an RWC log according to an embodiment.

FIG. 4 is a flowchart for the maintenance of RWC log 12 by controller 120 executing firmware 10 according to an embodiment. In block 402, controller 120 maintains RWC log 12 to persist over power cycles with entries identifying pending write commands reported as completed but whose data is not yet stored in at least one NVM. In the case where RWC log 12 is stored in volatile memory 140, RWC log 12 can be made power-safe by marking or otherwise flagging RWC log 12 for transfer to an NVM such as NVSM 128 in the event of an unexpected power loss. In other implementations, RWC log 12 can be maintained in an NVM such as NVSM 128 so that it is not necessary to transfer RWC log 12 during an unexpected power loss.

In block 404, controller 120 receives a write command from a host to store data in at least one NVM (e.g., disk 150 or NVSM 128) of DSD 106. As noted above, the host in some implementations can include a smart DSD such that the write command in block 404 could be received from a DSD that acts as a host.

In block 406, controller 120 buffers data for the write command in volatile memory 140 for storage in the at least one NVM. In block 408, controller 120 updates RWC log 12 to account for the write command as a pending write command that has been reported as completed but whose data has not yet been stored in NVM.

In block 410, controller 120 sends an indication back to the host that sent the write command to report completion of the write command before completing storage of the data for the write command in the at least one NVM. As noted above, notifying the host that the write command has been completed ordinarily increases the number of host commands that can be issued in a given period of time. In addition, deferring performance of the write command can improve an overall efficiency of DSD 106 by deferring commands until it would be more beneficial from a performance perspective to perform the command.

In block 412, controller 120 updates or removes a corresponding entry from RWC log 12 after data for the write command is stored in the at least one NVM of DSD 106. With reference to the example of RWC log 12 provided in FIG. 3, controller 120 in block 412 can update the completed length field to indicate that all of the write command has been performed in NVM. In another implementation, RWC log 12 can include a completion status or success field that can be set to a value or flagged to indicate that the command was completed. Such implementations would allow RWC log 12 to retain a history of the command while still allowing a host to determine which write commands were not actually completed by storing data in an NVM.

In other implementations, the entry corresponding to the write command is removed from RWC log 12 after the data for the write command has been stored in NVM. When recovering after a power loss at DSD 106, a host could then compare its history of write commands to the entries in RWC log 12 to determine whether any recovery action would need to be taken such as resending a write command or creating a new write command for the DSD or another DSD. In one example, the host can resend any write commands to DSD 106 if it found an entry for the write command in RWC log 12 since this would mean that the data for the write command had not actually been stored in NVM by the time of the power loss. By using RWC log 12, the recovery time for system 100 can ordinarily be shortened since hosts 101 and 102 can quickly determine which write commands were not stored in NVM, rather than having to read the NVM of DSD 106 or resend all of its write commands that are still in its memory.

Figure 5:
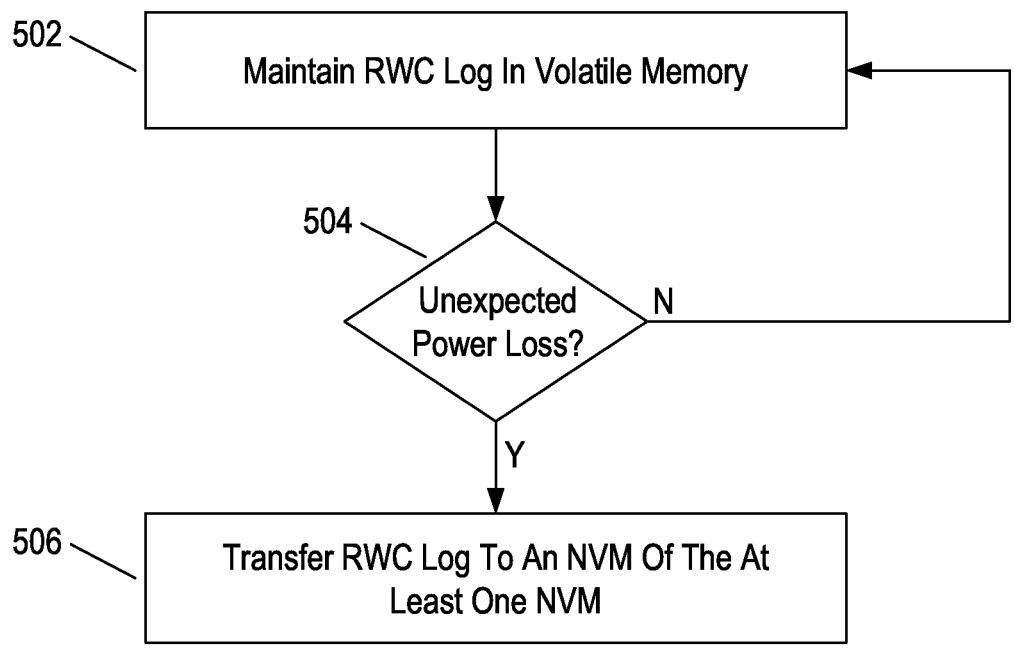
FIG. 5 is a flowchart for a power loss process according to an embodiment.

FIG. 5 is a flowchart for a power loss process that can be performed by controller 120 executing firmware 10 according to an embodiment where RWC log 12 is maintained in a volatile memory. In block 502, controller 120 maintains RWC log 12 in volatile memory 140.

In block 504, controller 120 determines whether there has been an unexpected power loss. This may involve, for example, controller 120 monitoring a power input of DSD 106 or receiving a signal from a power supply of DSD 106 indicating a loss in power. In situations where the power loss is expected, such as during a shutdown operation of DSD 106, controller 120 can complete any pending writes or otherwise record the pending write commands before shutting down.

In the event of an unexpected power loss in block 504, controller 120 transfers RWC log 12 to an NVM of DSD 106, such as NVSM 128. In one implementation, the rotational energy from the spinning of disk 150 can be used by a servo system of controller 120 to generate electric power for transferring RWC log 12 to NVM. In other implementations, a capacitor or battery may be used to facilitate the transfer of RWC log 12 to NVM.

Figure 6:
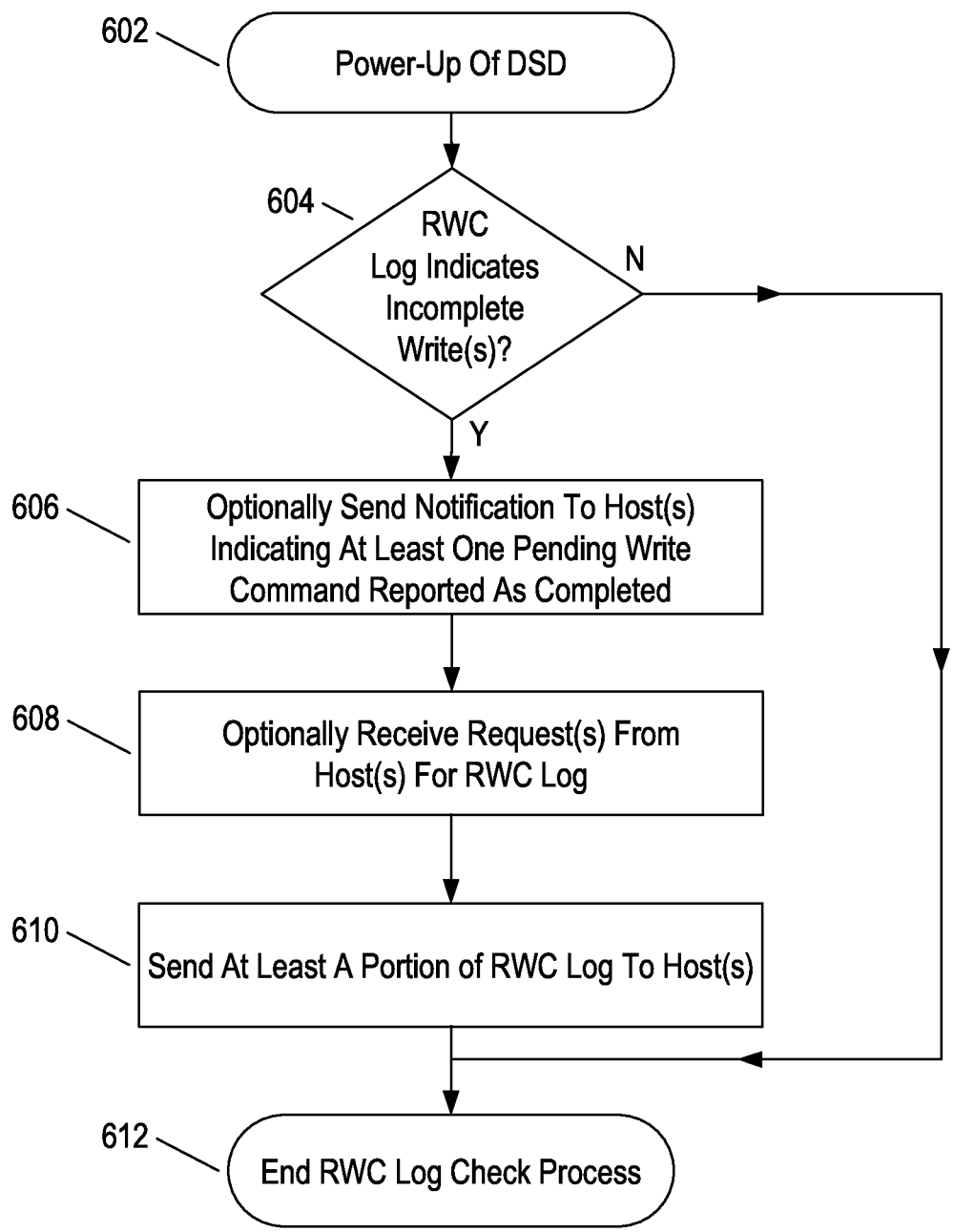
FIG. 6 is a flowchart for an RWC log check process according to an embodiment.

FIG. 6 is a flowchart for an RWC log check process that can be performed after powering up. The process of FIG. 6 can be performed by controller 120 executing firmware 10 according to one embodiment.

After powering up in block 602, controller 120 checks in block 604 whether RWC log 12 indicates that there are one or more incomplete write commands reported to a host as complete. In an implementation where entries are removed from RWC log 12 after completion of a write command, controller 120 in block 604 may check whether there are any entries in RWC log 12. The presence of entries in RWC log 12 would then indicate that there were pending or incomplete write commands.

In an implementation where a completion or other status indicator (e.g., a flag or a completed length) is used to indicate the completion of a command in RWC log 12, controller 120 would check RWC log 12 for any entries that were not indicated as successfully completed. In the example RWC log 12 of FIG. 3, the last write command at LBA 5,008 is indicated as partially completed based on its completed length field having only 300 LBAs completed out of a total of 452 LBAs for the command.

If RWC log 12 does not indicate that there are any incomplete write commands reported as complete, the process of FIG. 6 ends in block 612. On the other hand, if there are incomplete writes indicated by RWC log 12, controller 120 in block 606 may optionally send a notification to one or more hosts indicating that there is at least one pending write command that was previously reported as complete. The notification may be sent to all of the hosts in the system (e.g., hosts 101 and 102 in system 100 of FIG. 1) or controller 120 may only send the notification to the particular host or hosts that originated the incomplete write command.

The source of the write command may be determined using, for example, a socket identifier or other source indicator as shown in the example of FIG. 3. In some implementations, the notification can include RWC log 12 itself or portions of RWC log 12 so that the host or hosts can determine which write commands were not completed.

In block 608, controller 120 optionally receives one or more requests from one or more hosts in system 100. The request may be received in response to the notification sent in block 606 or may be in response to another indication that there was an unexpected power loss at DSD 106. In one implementation, the request can be for a copy of RWC log 12 to be sent to the host.

In block 610, controller 120 sends at least a portion of RWC log 12 to one or more hosts if it has not already done so as a part of the notification optionally sent in block 606. Controller 120 may send RWC log 12, or a portion thereof, in response to a request received in block 608 or controller 120 may send at least a portion of RWC log 12 on its own initiative. The RWC log check process then ends in block 612.

As noted above, the information maintained in an RWC log can improve and speed up a recovery process performed by a host in system 100 after an unexpected power loss at a DSD. With information on which write commands have actually been stored in NVM, the host can determine which data needs to be restored rather than performing unnecessary recovery measures such as blindly sending a large number of write commands out of an abundance of caution. In addition, the use of source identifiers (e.g., the socket identifier or the initiator shown in FIG. 3) can improve the recovery process when there are multiple hosts by identifying a host that sent an incomplete write command.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
at least one Non-Volatile Memory (NVM) for storing data;
a volatile memory; and
a controller configured to:
receive a write command from a host to store data in the at least one NVM;
buffer the data for the write command in the volatile memory for storage in the at least one NVM;
update a reported write command log to account for the write command as a pending write command reported as completed;
send an indication to the host reporting completion of the write command before completing storage of the data in the at least one NVM; and
wherein after power-up of the DSD, the controller is further configured to:
use the reported write command log to determine whether there are any pending write commands reported as completed before power-up of the DSD but whose data is not yet stored in the at least one NVM; and
if it is determined that there are one or more pending write commands reported as completed before power-up of the DSD but whose data is not yet stored in the at least one NVM, send a notification to the host indicating at least one pending write command reported as completed.

2. The DSD of claim 1, wherein the controller is further configured to update or remove an entry from the reported write command log after data for a corresponding pending write command reported as completed has been stored in the at least one NVM.

3. The DSD of claim 1, wherein the notification includes at least a portion of the reported write command log.

4. The DSD of claim 1, wherein after sending the notification, the controller is further configured to:
receive a request for the reported write command log from the host; and
send the reported write command log to the host in response to the request.

5. The DSD of claim 1, wherein the controller is further configured to:
maintain the reported write command log in the volatile memory; and
in the event of an unexpected power loss of the DSD, transfer the reported write command log to an NVM of the at least one NVM.

6. The DSD of claim 5, wherein the at least one NVM includes a Non-Volatile Solid-State Memory (NVSM), and wherein the controller is further configured to transfer the reported write command log to the NVSM in the event of an unexpected power loss.

7. The DSD of claim 1, wherein the controller is further configured to maintain the reported write command log in an NVM of the at least one NVM.

8. The DSD of claim 1, wherein each entry of the reported write command log indicates a starting logical address of data for a corresponding pending write command reported as completed.

9. The DSD of claim 1, wherein the reported write command log is maintained to persist over power cycles and includes entries identifying pending write commands reported as completed to one or more hosts but whose data is not yet stored in the at least one NVM.

10. The DSD of claim 9, wherein each entry in the reported write command log indicates a corresponding host that sent a write command associated with the entry.

11. The DSD of claim 1, wherein the controller is further configured to provide the host an indication of a number of write commands that can be recorded in the reported write command log.

12. The DSD of claim 1, wherein the controller is further configured to delay sending the indication to the host reporting completion of the write command if the reported write command log becomes full or approaches a size limit.

13. The DSD of claim 1, wherein the reported write command log indicates a completed portion of the data for the write command that has been stored in the at least one NVM.

14. The DSD of claim 1, wherein the reported write command log includes an operational code indicating at least one of whether the data for the write command serves as repeated filler data to fill an area of the at least one NVM, whether the write command was for an extended sequential write, and whether a write verify operation is required before removing a corresponding entry for the write command from the reported write command log.

15. A method for operating a Data Storage Device (DSD), the method comprising:
   receiving a write command from a host to store data in at least one Non-Volatile Memory (NVM) of the DSD;
   buffering the data for the write command in a volatile memory of the DSD for storage in the at least one NVM;
   updating a reported write command log to account for the write command as a pending write command reported as completed;
   sending an indication to the host reporting completion of the write command before completing storage of the data in the at least one NVM; and
   wherein after power-up of the DSD, the method further comprises:
      using the reported write command log to determine whether there are any pending write commands reported as completed before power-up of the DSD but whose data is not yet stored in the at least one NVM; and
      if it is determined that there are one or more pending write commands reported as completed before power-up of the DSD but whose data is not yet stored in the at least one NVM, sending a notification to the host indicating at least one pending write command reported as completed.

16. The method of claim 15, further comprising updating or removing an entry from the reported write command log after data for a corresponding pending write command reported as completed has been stored in the at least one NVM.

17. The method of claim 15, wherein the notification includes at least a portion of the reported write command log.

18. The method of claim 15, wherein after sending the notification, the method further comprises:
   receiving a request for the reported write command log from the host; and
   sending the reported write command log to the host in response to the request.

19. The method of claim 15, further comprising:
   maintaining the reported write command log in the volatile memory; and
   in the event of an unexpected power loss of the DSD, transferring the reported write command log to an NVM of the at least one NVM.

20. The method of claim 19, wherein the at least one NVM includes a Non-Volatile Solid-State Memory (NVSM), and wherein the method further comprises transferring the reported write command log to the NVSM in the event of an unexpected power loss.

21. The method of claim 15, further comprising maintaining the reported write command log in an NVM of the at least one NVM.

22. The method of claim 15, wherein each entry of the reported write command log indicates a starting logical address of data for a corresponding pending write command reported as completed.

23. The method of claim 15, wherein the reported write command log is maintained to persist over power cycles and includes entries identifying pending write commands reported as completed to one or more hosts but whose data is not yet stored in the at least one NVM.

24. The method of claim 23, wherein each entry in the reported write command log indicates a corresponding host that sent a write command associated with the entry.

25. The method of claim 15, further comprising providing the host an indication of a number of write commands that can be recorded in the reported write command log.

26. The method of claim 15, further comprising delaying sending the indication to the host reporting completion of the write command if the reported write command log becomes full or approaches a size limit.

27. The method of claim 15, wherein the reported write command log indicates a completed portion of the data for the write command that has been stored in the at least one NVM.

28. The method of claim 15, wherein the reported write command log includes an operational code indicating at least one of whether the data for the write command serves as repeated filler data to fill an area of the at least one NVM, whether the write command was for an extended sequential write, and whether a write verify operation is required before removing a corresponding entry for the write command from the reported write command log.

29. A non-transitory computer readable medium storing computer executable instructions for operating a Data Storage Device (DSD), wherein when the computer executable instructions are executed by a controller of the DSD, the computer executable instructions cause the controller to:
   receive a write command from a host to store data in at least one Non-Volatile Memory (NVM) of the DSD;
   buffer the data for the write command in a volatile memory of the DSD for storage in the at least one NVM;

update a reported write command log to account for the write command as a pending write command reported as completed;

send an indication to the host reporting completion of the write command before completing storage of the data in the at least one NVM; and wherein after power-up of the DSD, the controller is further configured to:

use the reported write command log to determine whether there are any pending write commands reported as completed before power-up of the DSD but whose data is not yet stored in the at least one NVM; and if it is determined that there are one or more pending write commands reported as completed before power-up of the DSD but whose data is not yet stored in the at least one NVM, send a notification to the host indicating at least one pending write command reported as completed.

* * * * *